US012688327B2

(12) United States Patent
Rolle et al.

(10) Patent No.: US 12,688,327 B2
(45) Date of Patent: Jul. 21, 2026

(54) DYNAMIC BALANCING OF INTERESTS IN DATA PRIVACY INTEGRATION PROTOCOLS

(71) Applicant: SAP SE, Walldorf (DE)

(72) Inventors: Benny Rolle, Reinhardshagen (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 18/629,084

(22) Filed: Apr. 8, 2024

(65) Prior Publication Data

US 2025/0315548 A1     Oct. 9, 2025

(51) Int. Cl.
*G06F 21/60*          (2013.01)
*G06F 21/62*          (2013.01)

(52) U.S. Cl.
CPC ........ *G06F 21/6245* (2013.01); *G06F 21/604* (2013.01)

(58) Field of Classification Search
CPC ........................... G06F 21/6245; G06F 21/604
See application file for complete search history.

(56) References Cited

U.S. PATENT DOCUMENTS

| | | | |
|---|---|---|---|
| 7,308,704 B2 | 12/2007 | Vogel et al. | |
| 7,350,237 B2 | 3/2008 | Vogel et al. | |
| 7,831,567 B2 | 11/2010 | Luther et al. | |
| 8,566,193 B2 | 10/2013 | Singh et al. | |
| 9,043,874 B2 | 5/2015 | Riley | |

| | | | |
|---|---|---|---|
| 9,286,301 B2 | 3/2016 | Motoyama | |
| 9,600,831 B1 | 3/2017 | Chou et al. | |
| 9,703,813 B2 | 7/2017 | Hegde et al. | |

(Continued)

FOREIGN PATENT DOCUMENTS

| | | |
|---|---|---|
| CA | 3096061 | 4/2023 |
| CN | 115809259 | 3/2023 |

(Continued)

OTHER PUBLICATIONS

U.S. Appl. No. 17/186,934, Rolle et al., Feb. 26, 2021.

(Continued)

*Primary Examiner* — Andrew Suh
(74) *Attorney, Agent, or Firm* — Fish & Richardson P.C.

(57) ABSTRACT

The present disclosure involves systems, software, and computer implemented methods for dynamically balancing different interests in data privacy integration protocols. One example method includes receiving, by different applications in a multiple-application landscape, consent information from data subjects that indicates consent or objection to processing performed by a data controller for a specified purpose. Consent information received by different applications is distributed to the different applications in the landscape. Each application synchronizes consent information obtained by the application and consent information obtained by other applications and distributed to the application to generate synchronized consent information. A processing action to be performed by a first application for a first purpose for a data subject is identified. Synchronized consent information for the data subject is retrieved and evaluated to determine whether the first processing action can be performed for the first purpose by the first application for the data subject.

20 Claims, 5 Drawing Sheets

(56) References Cited

U.S. PATENT DOCUMENTS

| | | | |
|---|---|---|---|
| 9,904,796 | B2 | 2/2018 | Pluder et al. |
| 10,409,790 | B2 | 9/2019 | Lehnert et al. |
| 10,430,413 | B2 | 10/2019 | Christoph et al. |
| 10,552,642 | B2 | 2/2020 | Rolle et al. |
| 10,642,805 | B1 | 5/2020 | Masse |
| 10,740,487 | B2 | 8/2020 | Barday et al. |
| 10,754,932 | B2 | 8/2020 | Wiederspohn et al. |
| 10,839,099 | B2 | 11/2020 | Vogel et al. |
| 11,042,654 | B2 | 6/2021 | Nos et al. |
| 11,113,417 | B2 | 9/2021 | Rolle |
| 2007/0089117 | A1 | 4/2007 | Samson |
| 2009/0228340 | A1 | 9/2009 | Bohannon |
| 2014/0082753 | A1 | 3/2014 | Sarferaz |
| 2014/0188572 | A1 | 7/2014 | Hegde et al. |
| 2015/0242531 | A1 | 8/2015 | Rodniansky |
| 2017/0091479 | A1 | 3/2017 | Pluder et al. |
| 2018/0189485 | A1 | 7/2018 | Jain et al. |
| 2018/0332082 | A1* | 11/2018 | Baumgart ............... G06F 21/34 |
| 2019/0236294 | A1 | 8/2019 | McDonald et al. |
| 2020/0019728 | A1 | 1/2020 | Rolle |
| 2020/0184087 | A1 | 6/2020 | Nos et al. |
| 2020/0285766 | A1 | 9/2020 | Jois et al. |
| 2021/0192052 | A1 | 6/2021 | Loch et al. |
| 2022/0043917 | A1 | 2/2022 | Rolle |
| 2022/0050834 | A1 | 2/2022 | Rolle et al. |
| 2022/0050920 | A1 | 2/2022 | Rolle |
| 2022/0058333 | A1 | 2/2022 | Rolle |
| 2022/0100755 | A1 | 3/2022 | Rolle |
| 2022/0277023 | A1 | 9/2022 | Rolle et al. |
| 2022/0309052 | A1 | 9/2022 | Rolle |
| 2023/0098812 | A1* | 3/2023 | Rivlin ................. H04L 63/0236 726/22 |
| 2023/0177194 | A1* | 6/2023 | Rolle .................. G06F 21/6245 726/27 |
| 2023/0185938 | A1 | 6/2023 | Schmidt et al. |
| 2023/0244637 | A1 | 8/2023 | Wu |
| 2024/0340494 | A1* | 10/2024 | Bao .................... H04N 21/4532 |
| 2024/0380608 | A1* | 11/2024 | Lee ...................... H04L 9/3247 |

FOREIGN PATENT DOCUMENTS

| | | | | |
|---|---|---|---|---|
| CN | 116629901 | A * | 8/2023 | ......... G06Q 30/0185 |
| WO | WO-2017142271 | A1 * | 8/2017 | ............. G06F 21/46 |

OTHER PUBLICATIONS

U.S. Appl. No. 17/457,797, Ighoroje et al., Dec. 6, 2021.

U.S. Appl. No. 17/457,802, Rolle et al., Dec. 6, 2021.

U.S. Appl. No. 17/457,811, Rolle et al., Dec. 6, 2021.

U.S. Appl. No. 17/457,816, Vogel et al., Dec. 6, 2021.

U.S. Appl. No. 17/457,824, Vogel et al., Dec. 6, 2021.

U.S. Appl. No. 17/457,827, Ighoroje et al., Dec. 6, 2021.

U.S. Appl. No. 17/680,717, Rolle et al., Feb. 25, 2022.

U.S. Appl. No. 17/680,741, Rolle et al., Feb. 25, 2022.

U.S. Appl. No. 17/680,759, Rolle et al., Feb. 25, 2022.

U.S. Appl. No. 17/680,858, Rolle, Feb. 25, 2022.

U.S. Appl. No. 17/702,013, Rolle, Mar. 23, 2022.

U.S. Appl. No. 17/718,770, Rolle, Apr. 12, 2022.

U.S. Appl. No. 18/049,063, Hesse et al., Oct. 24, 2022.

U.S. Appl. No. 18/073,164, Rolle et al., Dec. 1, 2022.

U.S. Appl. No. 18/074,745, Vogel et al., Dec. 5, 2022.

U.S. Appl. No. 18/077,476, Rolle et al., Dec. 8, 2022.

U.S. Appl. No. 18/077,493, Rolle et al., Dec. 8, 2022.

U.S. Appl. No. 18/347,029, Rolle et al., Jul. 5, 2023.

U.S. Appl. No. 18/347,065, Hesse et al., Jul. 5, 2023.

Edpb.europa.eu [online], "Guidelines May 2020 on consent under Regulation 2016/679" May 4, 2020, retrieved on Apr. 8, 2024, retrieved from URL <https://www.edpb.europa.eu/sites/default/files/files/file1/edpb_guidelines_202005_consent_en.pdf>, 33 pages.

Gesetze-im-internet.de [online], "Act against Unfair Competition" Jun. 2022, retrieved on Apr. 8, 2024, retrieved from URL <https://www.gesetze-im-internet.de/englisch_uwg/englisch_uwg.html>, 18 pages.

Help.sap.com [online], "End of Purpose (EoP) Check" Nov. 2020, [retrieved on Nov. 12, 2020], retrieved from: URL <https://help.sap.com/viewer/05a5505cc81943fb9d01e84cb2e135ef/750%20SP09/en-US/32b45853b2dc7425e10000000a44176d.html>, 3 pages.

Help.sap.com [online], "Master Data Integration" Nov. 2020, [retrieved on Mar. 16, 2021], retrieved from: URL <https://help.sap.com/viewer/99218f2c48044ddc8f2ea30adc0e38a1/7.1.21/en-US/46b8065a4df01517e10000000a114a6b.html?q=master%20data%20integration>, 2 pages.

Help.sap.com [online], "Processing Purposes" Jul. 2023, retrieved on Jul. 5, 2023, retrieved from URL <https://help.sap.com/docs/customer-data-platform/user-guide/processing-purposes?q=puposes. >, 9 pages.

Help.sap.com [online], "SAP Information Lifecycle Management" Nov. 2020, [retrieved on Mar. 16, 2021], retrieved from: URL <https://help.sap.com/doc/PRODUCTION/c3b6eda797634474b7a3aac5a48e84d5/1610%20002/en-US/frameset.htm>, 4 pages.

Herfurth, "Interessenbwagung nach Art. 6 Abs. 1 lit. f DS-GVO" Nov. 2018, 7 pages (with English abstract).

Inquaero.com [online], "Fulfill GDPR Art. 17 ("Right to Erasure"): SAP ILM Simplified Blocking and Deletion", Jun. 12, 2018, retrieved on Jan. 27, 2024, retrieved from URL <https://www.inquaero.com/blog/ilm-simplified-blocking-deletion>, 17 pages.

SAP "SAP Asset Manager Security Guide" Dec. 10, 2020, 28 pages.

SAP "SAP Event Stream Processor: Security Guide" Sep. 23, 2019, 58 pages.

Sap.com [online], "What is Gigya?" Aug. 2022, retrieved on Jul. 5, 2023, retrieved from URL <https://www.sap.com/products/acquired-brands/what-is-gigya.html?url_id=text-de-404-reclink>, 5 pages.

Wikipedia.org [online], "General Data Protection Regulation" Jan. 2013, [retrieved on Mar. 16, 2021], retrieved from: URL <https://en.wikipedia.org/wiki/General_Data_Protection_Regulation>, 16 pages.

Wikipedia.org [online], "Hyperscale computing" created on May 2013, retrieved on Dec. 1, 2022, retrieved from URL <https://en.wikipedia.org/wiki/Hyperscale_computing>, 2 pages.

Wikipedia.org [online], "Information privacy" created on May 2003, retrieved on Dec. 6, 2021, retrieved from URL <https://en.wikipedia.org/wiki/Information_privacy>, 7 pages.

Wikipedia.org [online], "Master Data" created on Oct. 2006, retrieved on Dec. 6, 2021, retrieved from URL <https://en.wikipedia.org/wiki/Master_data>, 2 pages.

Wikipedia.org [online], "Personal Data" created on May 2005, retrieved on Dec. 6, 2021, retrieved from URL <https://en.wikipedia.org/wiki/Personal_data>, 7 pages.

Wikipedia.org [online], "Personal Identifier" created on Feb. 2007, retrieved on Dec. 1, 2022, retrieved from URL <https://en.wikipedia.org/wiki/Personal_identifier>, 3 pages.

* cited by examiner

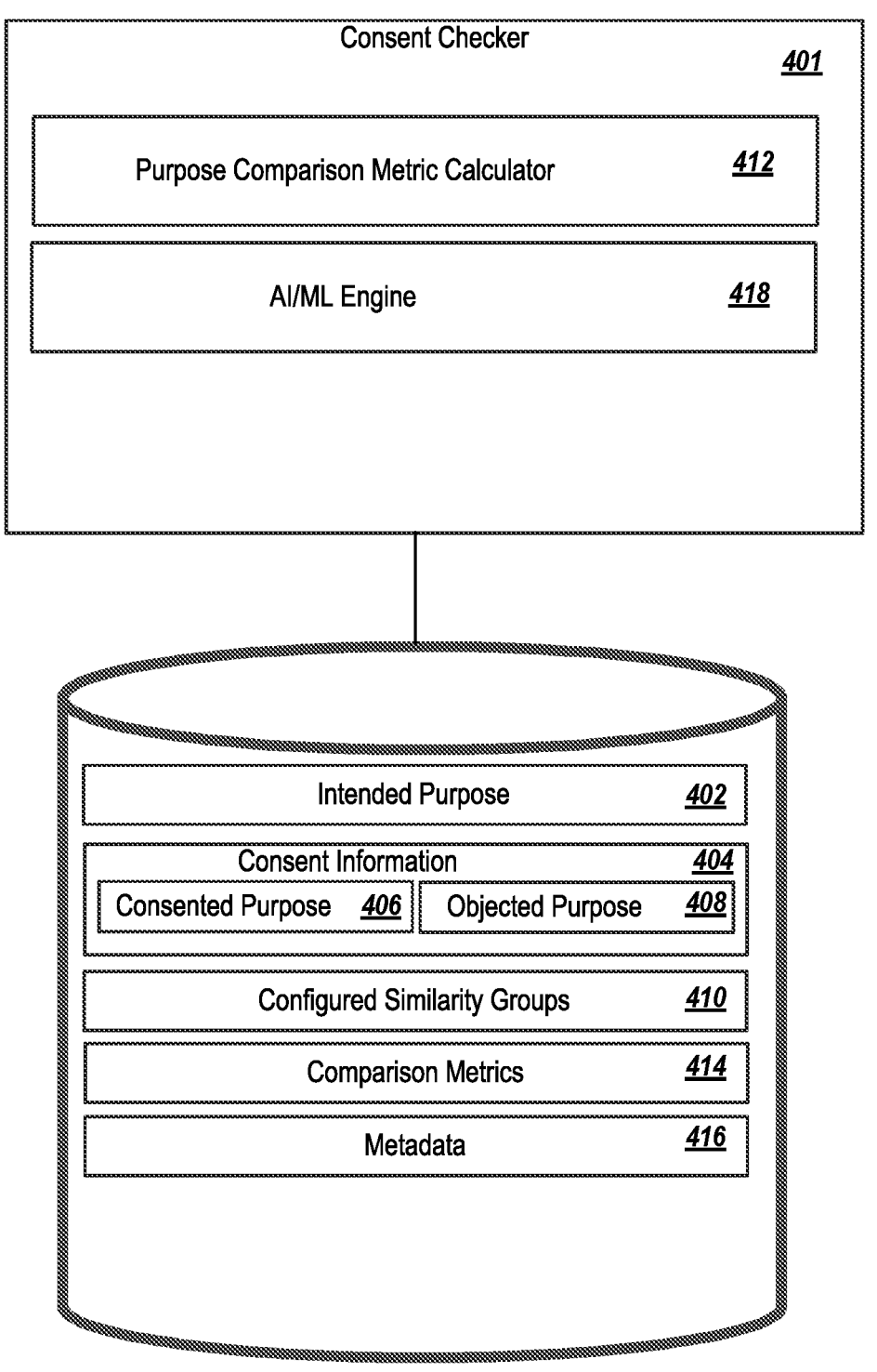
FIG. 4   *400*

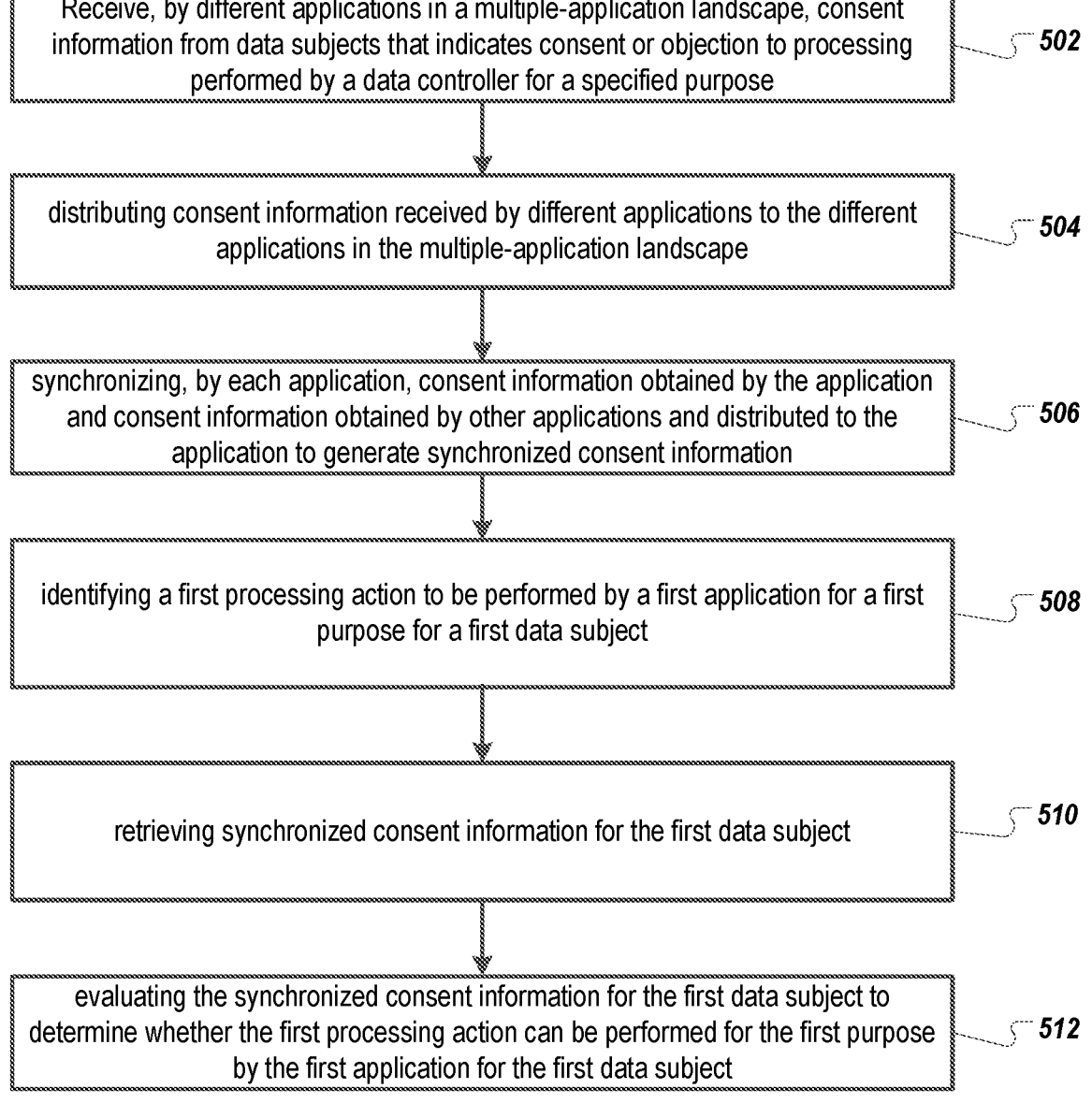

Receive, by different applications in a multiple-application landscape, consent information from data subjects that indicates consent or objection to processing performed by a data controller for a specified purpose — 502 distributing consent information received by different applications to the different applications in the multiple-application landscape — 504 synchronizing, by each application, consent information obtained by the application and consent information obtained by other applications and distributed to the application to generate synchronized consent information — 506 identifying a first processing action to be performed by a first application for a first purpose for a first data subject — 508 retrieving synchronized consent information for the first data subject — 510 evaluating the synchronized consent information for the first data subject to determine whether the first processing action can be performed for the first purpose by the first application for the first data subject — 512

FIG. 5    500

DYNAMIC BALANCING OF INTERESTS IN DATA PRIVACY INTEGRATION PROTOCOLS

TECHNICAL FIELD

The present disclosure relates to computer-implemented methods, software, and systems for dynamically balancing different interests in data privacy integration protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for dynamically balancing different interests in data privacy integration protocols. An example method includes: receiving, by different applications in a multiple-application landscape, consent information from data subjects that indicates consent or objection to processing performed by a data controller for a specified purpose; distributing consent information received by different applications to the different applications in the multiple-application landscape; synchronizing, by each application, consent information obtained by the application and consent information obtained by other applications and distributed to the application to generate synchronized consent information; identifying a first processing action to be performed by a first application for a first purpose for a first data subject; retrieving synchronized consent information for the first data subject; and evaluating the synchronized consent information for the first data subject to determine whether the first processing action can be performed for the first purpose by the first application for the first data subject.

Implementations can include one or more of the following features. At least a first application can a central consent service to obtain consent information for the first data subject. The consent information can include metadata that indicates one or more of a manner in which a consent request was presented to the first data subject, an indication of whether the first data subject gave consent for the first application to perform the first processing action for the first data subject for the first purpose, or an indication of whether the first data subject gave explicit objection for the first application to perform the first processing action for the first data subject for the first purpose. The first application can synchronize consent information with a second application by performing a peer-to-peer synchronization process with the second application. As another example, the first application can synchronize consent information with a second application by using a central synchronization service as an intermediary between the first application and the second application. Identifying the first processing action to be performed by the first application for the first purpose for the first data subject can include receiving, at the first application, a request to perform the first processing action for the first purpose for the first data subject. The first processing action can be an allowable action that is allowed to be performed by the first application for the first purpose for the first data subject if the first data subject has provided consent for performing of the first processing action for the first purpose for the first data subject. The first processing action can correspond to a legitimate processing action corresponding to a legitimate interest of a data controller that is allowed to be performed for the first purpose for the first data subject unless the first data subject has objected to performing of the first processing action for the first purpose for the first data subject. Evaluating the synchronized consent information for the first data subject can include determining that the first processing action is a consented action that can be performed for the first purpose for the first data subject based on determining that the first purpose substantially matches a consented purpose to which the first data subject has provided consent for the first processing action for the first data subject. As another example, evaluating the synchronized consent information for the first data subject can include determining that the first processing action cannot be performed for the first purpose for the first data subject based on determining that the first purpose does not substantially match any consented purposes in the consent information retrieved for the first data subject. In another example, evaluating the synchronized consent information for the first data subject can include determining that the first processing action is a legitimate interest action that can be performed for the first purpose for the first data subject based on determining that the first purpose does not substantially match any objected purpose in the consent information retrieved for the first data subject. As yet another example, evaluating the synchronized consent information for the first data subject can include determining that the first processing action is a legitimate interest action that cannot be performed for the first purpose for the first data subject based on determining that the first purpose substantially matches a first objected purpose in the consent information retrieved for the first data subject. Determining whether the first purpose substantially matches either a consented purpose or an objected purpose can include: providing the first purpose to a machine learning engine; providing the consented purpose or the objected purpose to the machine learning engine as a compared purpose; and receiving a classification from the machine learning engine regarding whether the first purpose substantially matches the compared purpose. As another example, determining whether the first purpose substantially matches either a consented purpose or an objected purpose can include: determining a first comparison metric for the first purpose; determining a second comparison metric for the consented purpose or the objected purpose; and determining whether the first purpose substantially matches the consented purpose or the objected purpose based on whether a difference between the first comparison metric and the second comparison metric is within a threshold distance. The first comparison metric and the second comparison metric can be based on purpose name similarity. As another example, the first comparison metric and the second comparison metric can be based on one or more of purpose metadata similarity, wherein purpose metadata includes at least one of purpose hierarchy information, purpose data category information, retention period information for data that is processed for a purpose, or data origin information for data that is processed for a purpose.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4 is a diagram that illustrates an example consent checker.

FIG. 5 is a flowchart of an example method for dynamically balancing different interests in data privacy integration protocols.

DETAILED DESCRIPTION

Figure 1:
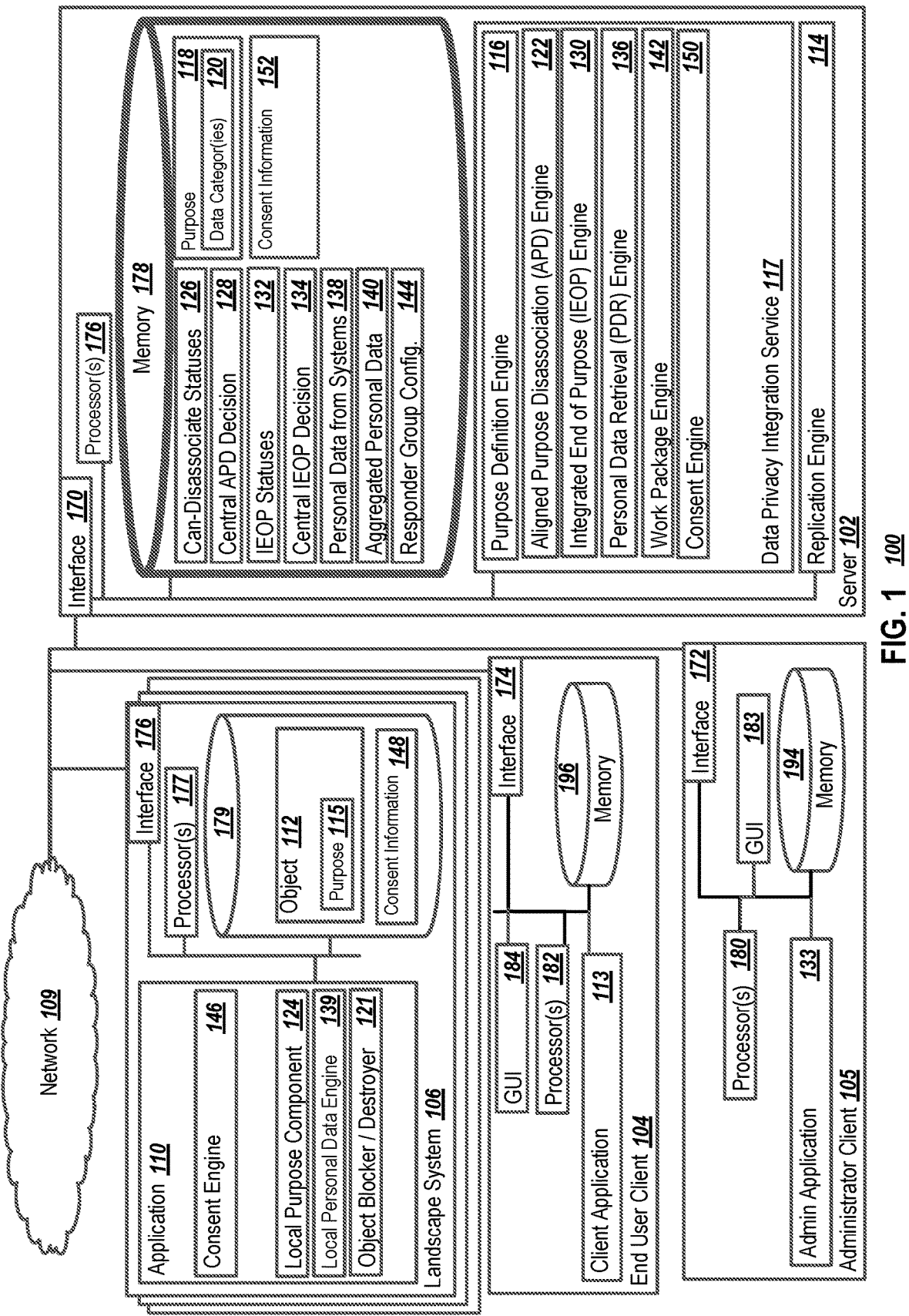
FIG. 1 is a block diagram illustrating an example system for integrated data privacy services.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457, 811, filed on Dec. 6, 2021 entitled "INTEGRATED PERSONAL DATA RETRIEVAL ACROSS MULTIPLE APPLICATIONS", and U.S. patent application Ser. No. 17/457, 802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service.

Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block application in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

A software system in which a data controller (e.g., a customer of the software system) models purposes for which personal data is processed can link custom-defined purposes with processing actions that are performed for these purposes, so that the processing of personal data within the software system is purpose-based. Additionally, data categories can be associated with purposes to define what personal data of which data categories can be used for different processing steps. Purpose-based processing is described in more detail in U.S. patent Ser. No. 18/347,029, filed Jul. 5, 2023, entitled "PURPOSE-BASED PROCESSING BY PURPOSE-ACTION ASSOCIATION,", the entire contents of which are hereby incorporated by reference.

A data controller may be legally permitted to perform certain data processing activities, such as processing of personal data, based on different legal grounds. For example, the data controller may be permitted to perform processing of personal data for a data subject, such as for a purpose of sending of marketing information to the data subject, based on the data subject consenting to such processing or based on the data controller (or a third party) having a legitimate interest to process the data for the purpose that outweighs the interests of the data subject. For example, some data processing may be required (or at least permitted) for the data controller to fulfill a contract to which the data subject is party. Accordingly, for software applications developed and/ or used by a data controller, a processing activity within the software might be triggered by different circumstances.

Regulations may stipulate that the data controller can perform a balancing of interests evaluation to determine whether the interests of the data controller (or third party) to conduct the processing outweigh the interests of the data subject to not conduct the processing, to determine, for example, whether personal data of the data subject may be processed for a given purpose. However, different scenarios can pose challenges for the data controller.

For example, a legal basis for certain processing such as a sending of marketing messages may be either consent or legitimate interest of the data controller. The data controller could ask a user for consent of processing for sending of marketing messages. The data controller may not get a definitive answer from the user, such as if the user did not check a check box indicating consent. Nonetheless, the data controller may determine that the data controller can send marketing messages based on a legitimate data controller interest but the user may be confused since they may feel they were given an option to provide consent but did not provide consent and that receiving market messages may be unexpected application behavior. In this example, the interests of the data subject (to not have unexpected processing, e.g., unexpected application behavior) outweighs the interests of the data controller to perform such processing; thus, the desired application behavior is to not conduct such processing.

As another example, data controllers and/or data subject may expect or desire certain application behavior based on purpose similarity. For instance, a user may have provided consent for a certain purpose, such as sending marketing messages for computer games. The data controller may determine and the data subject may consider other processing as reasonable, for similar purposes such as sending marketing messages for game console games. As another example, if a data subject opts out of processing for a certain purpose, such as receiving a newsletter relating to books, the data subject would not expect that the data controller would decide to perform processing for a substantially similar purpose, such as a newsletter related to electronic books.

In some situations, a data controller may perform a certain same processing for a purpose based on different legal bases. For example, for a newsletter sending example, the data subject could explicitly subscribe to the newsletter and the data controller can send the newsletter based on a legal ground of consent. As another example, the data controller could decide to send the newsletter based on a legal basis of legitimate interest after the data subject has purchased something related to the newsletter from the data controller.

Furthermore, in a multiple-application landscape in which a user uses multiple applications from a same data controller, other situations can occur. For example, a data subject may opt out of certain processing in a first application, such as a sending of marketing messages. The data subject may expect to not receive marketing messages from a second application developed by a same data controller, for example. The data subject may generally expect that the second application should comply with opt out information for same or substantially similar purposes the data subject provided to the first application.

To some data subjects, the applications used by the data controller may be fully transparent, i.e., some data subjects may not recognize whether an opt-in action or opt-out action was given within the context of a specific application. Such data subjects may then expect that the opt-in action or opt-out action applies to the entirety of processing of personal data under the responsibility by the same data controller in the context of the purpose the opt-in or opt-out was given. Such a situation can happen, for example, when the user interface does not explicitly limit the scope of applicability of the opt-in or opt-out action to a specific part of the software, such as a single application of multiple applications, or when the user is not directly using the software that processes personal data concerning the user.

To handle the challenges described above, automated dynamic balancing of interest processing can be performed regarding handling different legal bases, consent information, substantially similar purposes in a same or different applications, and other scenarios. With dynamic balancing of interests, a data controller can automatically determine how and when to process personal data for legitimate interests while reducing risk of infringing data privacy laws, thus reducing risk of administrative fines and civil liability. Without a dynamic balancing of interests solution, administrators might have to ensure compliance with manual processes that can be error-prone, inconsistent, and complex. Particularly, non-dynamic solutions may be impractical in multiple application landscapes that involve an integrated application suite.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer. Defined purposes can be stored as purposes 118.

In some cases, a purpose 118 can be associated with data categories 120. An administrator can assign one or more data categories 120 to a purpose 118 to specify which of potentially different attribute sets stored for a data object can be used when data for the purpose 118 is processed.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose. Purpose-based processing can therefore be performed in the landscape system 106.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned disassociation approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End of Purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144.

Referring again to purpose-based processing, each landscape system 106 can include a consent engine 146 that can receive consent information 148 from data subjects that indicates consent or objection to processing performed by the data controller for a specified purpose. Consent information received by different landscape systems 106 can be distributed to other landscape systems 106, such as with peer-to-peer approaches and/or using a central consent engine 150 as an intermediary. For example, the central consent engine 150 may maintain a central repository 152 of centralized consent information or the central consent engine 150 may act as a conduit for distribution of consent information between different landscape systems 106. When a given landscape system 106 receives consent information obtained by another landscape system, the consent engine 146 of the given landscape system 106 can synchronize consent information obtained by the landscape system 106 and consent information obtained by other landscape systems 106.

After consent information has been synchronized, the landscape system 106 may identify a processing action to be performed by the application 100 for the purpose 115 for a data subject (e.g., based on receiving an input to perform the processing action for the data subject). The consent engine 146 can retrieve synchronized consent information for the data subject and evaluate the synchronized consent information for the data subject to determine whether the processing action can be performed for the purpose 115 by the application 110 for the data subject, as described in more detail below.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 170, 172, 173, and 174 are used by the server 102, the end-user client device 104, the landscape system 106, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate.

Conversely, the features and functionality of various components can be combined into single components as appropriate.

The server 102 includes memory 178. In some implementations, the server 102 includes multiple memories. The memory 178 may include any type of memory or database module and may take the form of volatile and/or nonvolatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 133, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
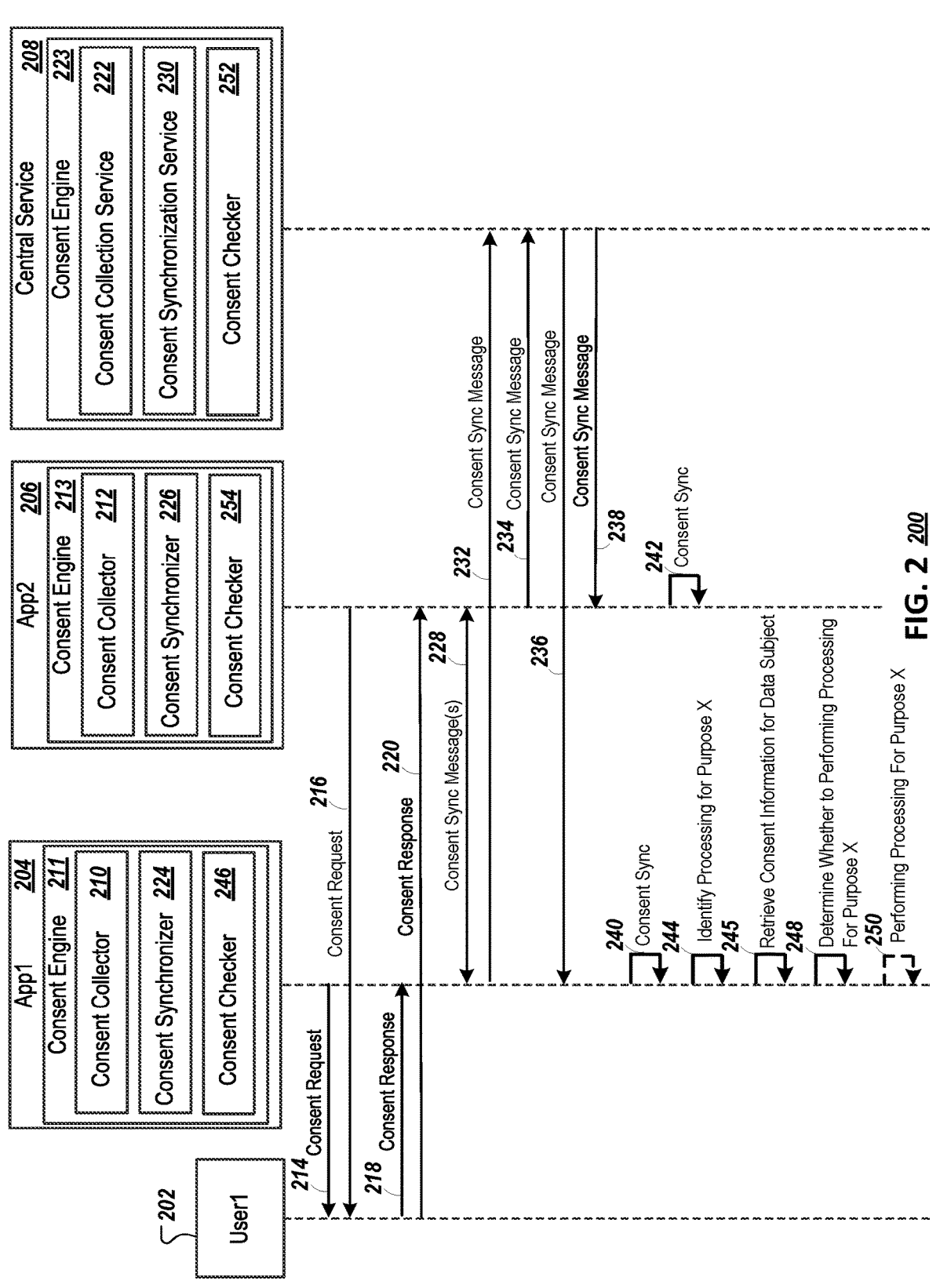
FIG. 2 is a swim lane diagram of an example process for dynamic balancing of interests.

FIG. 2 is a swim lane diagram of an example process 200 for dynamic balancing of interests. The process 200 can involve, for example, a user device 202 (e.g., associated with a "User1" user), a first application 204, a second application 206, and in some implementations, a central service 208. The first application 204 and the second application 206 can be configured (e.g., at launch or user registration, or before certain processing is performed) to provide consent requests to the user that ask, for instance, whether the user consents (or objects) to certain processing a respective application may perform for a given purpose.

For instance, a consent collector 210 in a consent engine 211 of the first application 204 and a consent collector 212 in a consent engine 213 of the second application 206 may respectively provide consent requests 214 and 216 to the user device 202. The consent collector 210 of the first application 204 and the consent collector 212 of the second application 206 may subsequently receive consent responses 218 or 220 from the user device 202, respectively. Although shown as being performed by respective applications, in some implementations, some consent collection activities can be performed on behalf of one or more applications by a consent collection service 222 in a consent engine 223 provided by the central service 208. Consent responses and metadata about consent responses can be stored (e.g., by the first application 204, the second application 206, and in some cases, by the central service 208).

Figure 3:
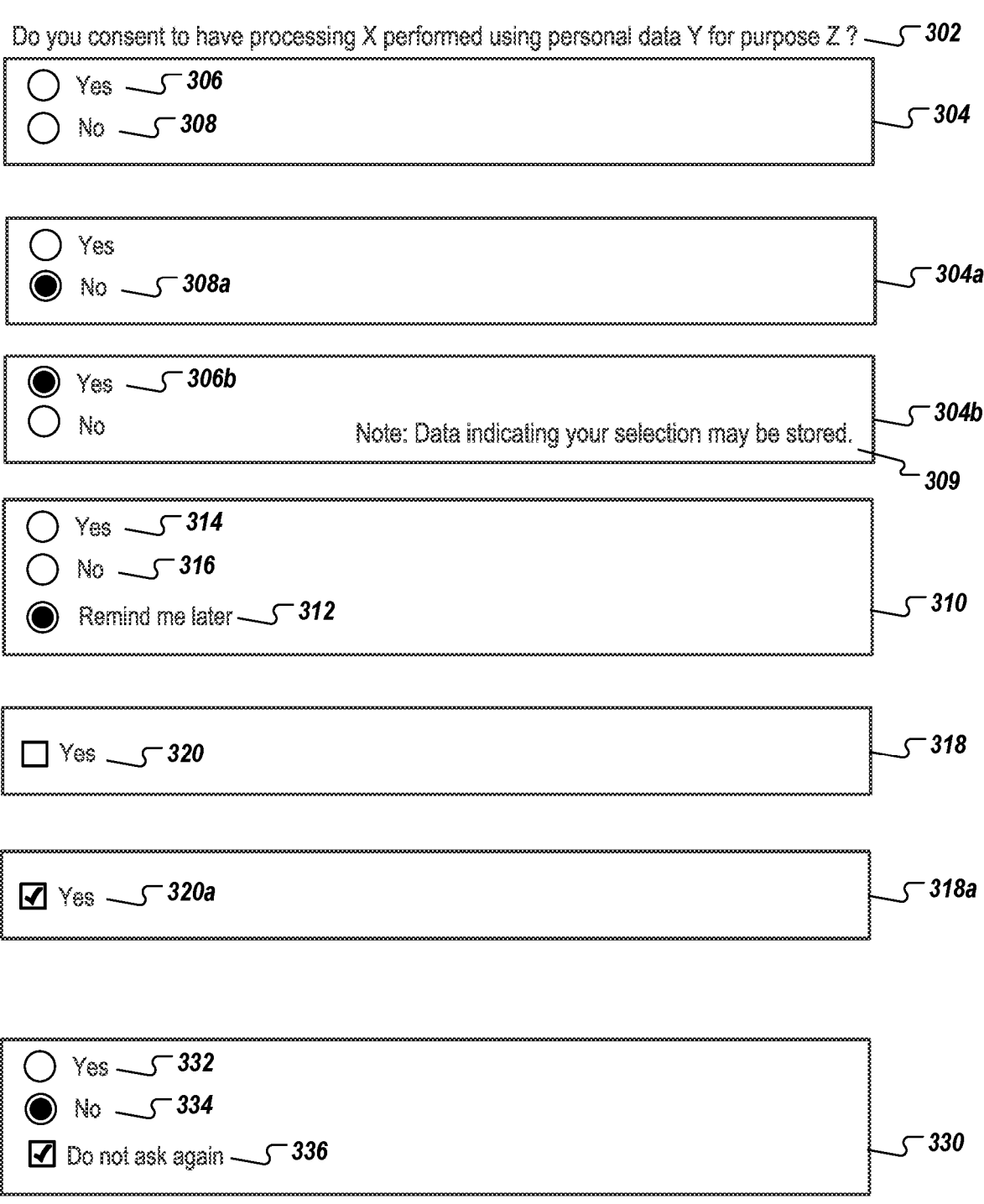
FIG. 3 is a diagram that illustrates various user interface approaches for capturing user consent for processing data for a given purpose.

FIG. 3 is a diagram 300 that illustrates various user interface approaches for capturing user consent for processing data for a given purpose. For example, a prompt 302 can be displayed in a given user interface that asks a data subject (e.g., referred to as "user" below) whether they consent to have processing "X" performed using personal data "Y" of the data subject for a purpose "Z". The prompt 302 can be displayed with various different types of user interface controls that enable the user to answer the question represented in the prompt 302.

For example, radio buttons or check box(es) can be used that enable the user to select or interact with one or more user interface controls. For instance, an example user interface widget 304 includes a radio button 306 representing an answer of yes to the question represented in the prompt 302 and a radio button 306 representing an answer of no. The user interface widget 304 represents a radio button group that can include associated code that can require that the user select one and only one radio button in the group.

For example, a user interface widget 304*a* illustrates the user interface widget 304 in a state in which the radio button 308 is selected, as illustrated by a selected radio button 308*a*. Similarly, a user interface widget 304*b* illustrates the user interface widget 304 in a state in which the radio button 306 is selected, as illustrated by a selected radio button 306*b*. Once a respective radio button is selected, the user can only deselect that radio button by selecting another radio button. The user interface widget 304 can be configured to enforce selection of one radio button in a radio button group (e.g., the user interface widget 304 can be configured to not allow saving of data representing a state shown in the user interface widget 304 of no radio buttons being selected). In some cases, a user interface widget may include a message such as a note 309 that indicates that user selections may be stored by the system.

In some cases, the state shown in the user interface widget 304 may be an initially displayed state, with the user interface widget 304 being configured to not allow saving of such a state and/or not allowing the user to proceed to a next step, etc. (e.g., without selecting a respective radio button). In other implementations, a default radio button may be initially selected (e.g., either the Yes or No button may be considered as a default).

However, different approaches or interpretations might be used to store whether the user gave explicit consent. For example, if the Yes option is chosen as a default (e.g., as shown by the selected radio button 306*b*, which is this example may represent an automatically-selected default), there may be issues as far as considering whether the user actually gave explicit consent. If the user is presented with a No option as a default answer (e.g., as may be represented by the selected radio button 308*a*) and the user then explicitly selects a Yes answer then the system can consider and store the user selection of the Yes answer as an explicit consent. However, if the No option is chosen as a default there may be issues as far as considering whether the user actually explicitly objected to the processing mentioned in the prompt 302 if the default selection remains with no further user interaction. In some cases, meta information may be stored that indicates that a given default option (e.g., Yes or No) was displayed but the user did not explicitly make a selection (e.g., indicating that the user left the default option selected). In some cases, given the above potential confusion points regarding whether the user gave an explicit content or an explicit objection, other user interface groups of controls can be used.

For example and as shown in a user interface widget 310, a third radio button 312 representing an option of "I am not answering now, remind me later" can be included and can be automatically selected as a default answer, for example. Then, a user's explicit consent can be detected and recorded in response to explicit selection of a Yes radio button 314 and a user's explicit objection can be detected and recorded in response to explicit selection of a No radio button 316 (and perhaps some other action, such as selection of a "save" or "next" button, etc.). In some cases, if the default "remind me later" selections remains (or is returned to), the system might not record any data for the user with respect to the prompt 302, since the system may consider that no determination of explicit consent or explicit objection can be affirmatively detected. In other cases, meta information indicating that the "remind me later" option was selected (or left selected as an initial default). In some cases, the system may store meta information that indicates that a third option (other than Yes or No) was presented to a user.

As another example, in some cases, an example widget 318 that includes a check box 320 may be used in combination with the prompt 302. The check box 320 may be initially deselected (e.g., not checked), as shown in the widget 318. If the user explicitly checks the check box 320 (e.g., as shown by a checked check box 320*a* in a widget 318*a*), the system can record data that indicates that the user explicitly consented to the processing mentioned in the prompt 302. However, if the user fails to interact with the check box 320 (or interacts with the check box 320 but returns the check box 320 to a previous state), for instance, the system may determine to not record data relating to the prompt, as an effective "no answer" may be deemed as inconclusive as to whether the user consented or objected to the processing. In some cases, meta information may be stored indicating that the user failed to interact with the checkbox (or otherwise left the checkbox in a final unchecked state, such as selecting but then deselecting the check box 320).

In some cases, different types of user interface controls can be used for a same widget, and in these cases different types of metadata may be stored. For instance, an example widget includes radio buttons 332 and 334 as well as a check box 336 that represents a "do not ask again" option. The check box 336 may be initially unchecked. A user subsequently checking the check box 336 may be interpreted as a stronger indication of consent or objection (corresponding to selection of the radio button 332 or 334, respectively) than a consent response acquired using the example widget 304, for example. In some cases, an application may present an option for "do not ask again for X months" (or some other time window). Some systems, for example, may be configured so that consent response information has an expiration date whereby consent information is deleted after a certain time period expires. In some cases, consent response storage approaches may vary based on how a consent request was presented to the data subject (e.g., a third option, two options, one optional option may have different storage approaches or time limits).

In some cases, other meta information may describe what type of consent request was presented (e.g., two radio buttons, three radio buttons, a check box, etc.). Additionally, meta information may include various types of information that may indicate whether a consent was given in an explicit way or a non-explicit way, for example. There also may be further possible options regarding how a data subject consent can be collected. For example, a data subject might click on different links or the data subject might provide the consent by a phone call with a service center agent who then enters information indicating the consent into the system, etc. Collected consent information can be shared between applications as appropriate, used to determine whether certain processing should occur, etc., as described herein.

For example and referring again to FIG. 2, in some implementations, applications can share and synchronize consent information received by different respective applications. For instance, a consent synchronizer 224 of the first application 204 and a consent synchronizer 226 of the second application 206 can exchange consent synchronization messages 228 to communicate and share consent information received in one application with the other application. In some cases, the consent synchronizers 224 and 226 utilize a consent synchronization service 230 provided by the central service 208.

For example, the first application 204 may, after receiving new consent information such as the consent response 218, send a synchronization message 232 that includes information from the consent response 218 to the consent synchronization service 230. Similarly, the second application 206 may, after receiving new consent information such as the consent response 220, send a synchronization message 234 that includes information from the consent response 220 to the consent synchronization service 230. The consent synchronization service 230 can be configured to distribute consent information received from one application to other applications. For instance, the consent synchronization service 230 can send a synchronization message 236 to the first application 204 that includes information from the consent response 220 that the consent synchronization service 230 received from the second application 206. Similarly, the consent synchronization service 230 can send a synchronization message 238 to the second application 206 that includes information from the consent response 218 that the consent synchronization service 230 received from the first application 204.

The first application 204 and the second application 206 can respectively perform a consent synchronization process 240 or a consent synchronization process 242 to synchronize consent information received from the consent synchronization service 230 and/or consent information received from other applications with consent information already stored or managed by the respective application. Synchronized consent information and other information can be used by consent checkers to determine whether to perform certain processing, as described below.

For example, at 244, the first application 204 may identify processing to be performed by the first application 204 for a purpose "X". For example, the first application 204 may receive a request or perform some other determination that processing for the purpose X may be performed. At 245, a consent checker 246 of the first application 204 can retrieve consent information for the data subject (e.g., the user of the user device 202). At 248, the consent checker 246 can evaluate the retrieved consent information (and possibly other information) to determine whether to performing the processing for the purpose X. At 250, if the consent checker 246 determines to perform the processing for the purpose X for the data subject, the first application 204 can perform the processing for the purpose X for the data subject.

In some cases, the consent checker 246 uses service(s) of a consent checker 252 of the central service 208. A consent checker 254 of the second application 206 can perform processing similar to that of the consent checker 246, but for the second application 206. Consent checking, whether performed by the consent checker 246, the consent checker 254, or the consent checker 252, can include various types of processing, as described below.

FIG. 4 is a diagram 400 that illustrates an example consent checker 401. The consent checker 401 can be or include portions of the consent checker 246, the consent checker 254, or the consent checker 252 described above with respect to FIG. 2. The consent checker 401 can identify an intended purpose 402, which can be a purpose for which the consent checker 401 is checking regarding whether processing can be performed by a data controller for a data subject. The consent checker 401 can compare the intended purpose 402 to consent information 404.

The consent information 404 can include a consented purpose 406 for which the data subject consented for processing to be performed and/or an objected purpose 408 for which the data subject objected for processing to be performed. Although a single consented purpose 406 and objected purpose 408 are shown for illustration and discussion, the consent information 404 can include multiple consented and/or objected purposes to which the consent checker 401 can compare to the intended purpose 402.

If the intended purpose 402 corresponds to processing of personal data which is allowed only if the data subject has consented, the consent checker 401 can determine whether the intended purpose 402 either matches or is substantially similar to the consented purpose 406 or another consented purpose of the data subject. If the consent checker 401 determines that the intended purpose 402 either matches or is substantially similar to the consented purpose 406 or another consented purpose, the consent checker 401 can determine that the processing for the intended purpose can be performed for the data subject, based on the consent of the data subject. If the consent checker 401 determines that the intended purpose 402 neither matches nor is substantially similar to the consented purpose 406 or any other consented purpose of the data subject, the consent checker 401 can determine that the processing for the intended purpose cannot be performed for the data subject.

As another example, if the intended purpose 402 is a purpose for which the data controller has a legitimate interest, the consent checker 401 can determine whether the intended purpose 402 either matches or is substantially similar to the objected purpose 408 or another objected purpose of the data subject. If the consent checker 401 determines that the intended purpose 402 either matches or is substantially similar to the objected purpose 408 or another objected purpose, the consent checker can determine that the processing for the intended purpose 402 cannot be performed for the data subject, based on the objection of the data subject. Conversely, if the consent checker 401 determines that the intended purpose 402 neither matches nor is substantially similar to the objected purpose 408 or any other objected purpose of the data subject, the consent checker 401 can determine that the processing for the intended purpose can be performed for the data subject, based on the legitimate interest of the data controller.

The consent checker 401 can use various approaches to determine whether the intended purpose 402 either matches or is substantially similar to a purpose such as the consented purpose 406 or the objected purpose 408. For example, the consent checker 401 can determine a match based on a purpose name (e.g., human-readable name) of the intended purpose 402 matching a purpose name of a compared purpose. As another example, the consent checker 401 can determine that the purpose name of the intended purpose 402 matches a purpose name of a purpose in configured similarity groups 410. The configured similarity groups 410 can include preconfigured mappings of purpose names to other purposes. An administrator can configure the configured similarity groups 410, for example. If both the intended purpose 402 and another purpose are in a same configured similarity group 410, the consent checker 401 can determine that the intended purpose is substantially similar to the purpose.

As another example, a purpose comparison metric calculator 412 can calculate one or more comparison metrics 414 of both the intended purpose 402 and a purpose. If respective comparison metrics 414 of the intended purpose 402 and the purpose are within a threshold distance, the consent checker 401 can determine that the intended purpose is substantially similar to the purpose. If the respective comparison metrics 414 of the intended purpose 402 and the purpose are not within the threshold distance, the consent checker 401 can determine that the intended purpose is not substantially similar to the purpose.

Some comparison metrics 414 can be based on the purpose names of compared purposes. For example, a similar human-readable name of both purposes may be an indicator for similar purposes. For instance, a data subject objection to a purpose with a human-readable name of "music-info-email-messages" and another purpose with a human-readable name "music-advertising-mail" may be determined to be substantially similar by the consent checker 401, based on certain metrics. For example, the purpose comparison metric calculator 412 can calculate and include in the comparison metrics 414 a "Hamming distance" metric for two compared purposes that reflects, for example, how many characters would have to be changed in a first human-readable purpose name to create a second human-readable purpose name, with changes including exchanging a character by another character, deleting a character, or adding a new character. Other types of string comparison metrics can be calculated and compared.

Other comparison metrics 414 calculated by the purpose comparison metric calculator 412 can include metrics calculated using different types of metadata 416. The metadata 416 can include purpose, processing, and/or personal data metadata, for example.

For example, the metadata 416 may indicate that the intended purpose 402 and a compared purpose are both included in purpose hierarchies. The purpose comparison metric calculator 412 can calculate metrics that reflect similarity between the respective purpose hierarchies. As another example, the purpose comparison metric calculator 412 can calculate comparison metrics 414 that reflect similarities between data categories of data that is processed for respective purposes. For example, two similar purposes may both correspond to processing email address information whereas two purposes that are ultimately determined to be dissimilar can be correspond to processing of either email addresses or computing device addresses, for example. In some cases, the metadata 416 may include other information, such as tags, that may indicate types or categories of processing and which may be compared.

The metadata 416 may indicate a retention period for personal data that may be processed for the intended purpose 402 and a compared purpose. If the retention periods are substantially different, the consent checker 401 may use that information, at least in part, to determine that the two purposes are not substantially similar. As another example, the metadata 416 can indicate an origin of personal data that may be processed for different purposes. If the intended purpose corresponds to processing data collected by the data subject and another purpose corresponds to processing data collected by a third party, the consent checker 401 may use that information, at least in part, to determine that the two purposes are not substantially similar.

In some cases, the purpose comparison metric calculator 412 calculates a "meta information distance metric" that indicates how many metadata attributes of a purpose in the metadata 416 would need to be changed for the purpose so that the metadata of the purpose matches the metadata of the intended purpose 402. The consent checker 401 can determine that a purpose is substantially similar to the intended purpose 402 if the meta information distance metric of the purpose is less than a predetermined threshold, for example. Additionally, or alternatively, the purpose comparison metric calculator can determine and consider how different certain corresponding metadata items are from one another. For instance, a retention period for one purpose may be expressed in days whereas a retention period for another purpose may be expressed in years.

In some implementations, the metadata 416 includes consent metadata, such as metadata that indicates one or more of a manner in which a consent request was presented to a data subject, an indication of whether the data subject gave explicit consent for processing for a given consented purpose 406, or an indication of whether the data subject gave explicit objection for processing for a given objected purpose 408. The consent checker 401 can use the consent metadata in some situations or for some decisions. For example, if the consent metadata indicates the user was given an option to object to a purpose but did not provide any user input, the consent checker 401 can determine (e.g., based on administrator configuration information) whether to treat such a consent request/consent response (e.g., a lack of an objection) as equivalent to a providing of consent.

In some implementations, the consent checker 401 includes an Artificial Intelligence/Machine Learning (AI/ML) engine 418. For instance, a given customer (e.g., data controller) that uses a suite of software applications provided by a software vendor can enable that similarities between purposes are established at least in part using self-learning techniques. The AI/ML engine 418 can be, use, or include, for example, a neural network or some other AI or analyzation algorithm that determines that purposes are similar based on the name or the description of a purpose or other purpose-related information mentioned above.

In some cases, the AI/ML engine 418 can be trained on data from multiple customers. A software provider can, for example, structure customer contracts such that a customer can optionally anonymously share configured purpose information, so that the software provider can use customer purpose data to train model(s) used by the AI/ML engine 418. The software provider can provide the AI/ML engine 418 to customers who provide training data, for example, once the AI/ML engine 418 has been trained. Other customers who have not provided training data may still receive and use the AI/ML engine 418 but perhaps incur a cost (or a higher cost) to obtain access to the AI/ML engine 418. The software provider can thus provide incentives for customers to share purpose data, which can help the software provider obtain sufficient customer data for training the AI/ML engine 418. Customers may also be motivated to agree to provide training data since use of the AI/ML engine 418 by the customer can increase a likelihood of being in compliance with purpose-based regulations. The AI/ML engine 418 can, therefore, be trained on purpose-processing action assignment data from multiple customers.

Customers may exhibit similar behavior and/or use similar settings defining purposes. For example, purposes that have a certain name, or that are linked to certain data categories or to data categories that have a certain name or other common characteristics, or that are linked to same or similarly named processing actions may be in fact substantially similar purposes.

In general, once the AI/ML engine 418 is trained and provided for use to customers, the AI/ML engine 418 can, given two sets of purpose information (e.g., two purpose names and corresponding purpose metadata), generate a classification indicating whether the AI/ML engine 418 deems the two purposes as substantially the same purpose. In some implementations, a classification may be associated with a percentage or other indicator that reflects a confidence value of the classification. In some implementations, the AI/ML engine 418 may send information to an administrator (e.g., using alerts and/or logs) regarding classifications of purposes that have been determined to be substantially similar. In some cases, purpose similarity classifications are refined over time. For example, a data protection administrator review (e.g., in a dashboard or in log files) classifications generated by the AI/ML engine 418. The administrator may select and accept or reject a given classification. Classification acceptance/rejection can be provided to the AI/ML engine 418 for use by the AI/ML engine 418 in adjusting future classifications. When a landscape include multiple consent checkers, feedback can be distributed to different consent checkers.

The AI/ML engine 418 can use various techniques to learn customer purpose assignments. For example, a purpose definition engine may provide a user interface for defining purposes that includes a text field for enabling a customer to enter a free-text purpose name. Accordingly, different customers may name a same purpose with different names, such as "sales", "sell items", "accept orders", etc. Accordingly, the AI/ML engine 418 may maintain multiple synonymous names for a purpose, so that the AI/ML engine 418 can make more accurate classifications. Furthermore, in some implementations, the AI/ML engine 418 may consider purposes with potentially synonymous names as synonymous and use further factors in such an assessment. For example, if a first set of customers maintains a purpose "sales" and a second set of customers maintains a purpose "orders", but customers in both sets typically associate the same or similar sets of processing actions with the purpose, the AI/ML engine 418 might consider the purposes as being synonymous.

FIG. 5 is a flowchart of an example method 500 for dynamically balancing different interests in data privacy integration protocols. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the server 102 of FIG. 1.

At 502, different applications in a multiple-application landscape receive consent information from data subjects that indicates consent or objection to processing performed by a data controller for a specified purpose. For example, at least a first application can use a central consent service to obtain consent information for the first data subject, the consent information includes metadata that indicates one or more of a manner in which a consent request was presented to the first data subject, an indication of whether the first data subject gave consent for the first application to perform the first processing action for the first data subject for the first purpose, or an indication of whether the first data subject gave explicit objection for the first application to perform the first processing action for the first data subject for the first purpose.

The consent information can include metadata that indicates one or more of a manner in which a consent request was presented to the first data subject, an indication of whether the first data subject gave consent for the first application to perform the first processing action for the first data subject for the first purpose, or an indication of whether the first data subject gave explicit objection for the first application to perform the first processing action for the first data subject for the first purpose.

At 504, consent information received by different applications is distributed to the different applications in the multiple-application landscape.

At 506, each application synchronizes consent information obtained by the application and consent information obtained by other applications and distributed to the application to generate synchronized consent information. The first application can synchronize consent information with a second application by performing a peer-to-peer synchronization process with the second application. As another example, the first application can synchronize consent information with a second application by using a central synchronization service as an intermediary between the first application and the second application.

At 508, a first processing action to be performed by a first application for a first purpose for a first data subject is identified. Identifying the first processing action to be performed by the first application for the first purpose for the first data subject can include receiving, at the first application, a request to perform the first processing action for the first purpose for the first data subject. The first processing action can be an allowable action that is allowed to be performed by the first application for the first purpose for the first data subject if the first data subject has provided consent for performing of the first processing action for the first purpose for the first data subject. The first processing action can correspond to a legitimate processing action corresponding to a legitimate interest of a data controller that is allowed to be performed for the first purpose for the first data subject unless the first data subject has objected to performing of the first processing action for the first purpose for the first data subject.

At 510, synchronized consent information for the first data subject is retrieved.

At 512, the synchronized consent information is evaluated for the first data subject to determine whether the first processing action can be performed for the first purpose by the first application for the first data subject. Evaluating the synchronized consent information for the first data subject can include determining that the first processing action is a consented action that can be performed for the first purpose for the first data subject based on determining that the first purpose substantially matches a consented purpose to which the first data subject has provided consent for the first processing action for the first data subject. As another example, evaluating the synchronized consent information for the first data subject can include determining that the first processing action cannot be performed for the first purpose for the first data subject based on determining that the first purpose does not substantially match any consented purposes in the consent information retrieved for the first data subject. In another example, evaluating the synchronized consent information for the first data subject can include determining that the first processing action is a legitimate interest action that can be performed for the first purpose for the first data subject based on determining that the first purpose does not substantially match any objected purpose in the consent information retrieved for the first data subject. As yet another example, evaluating the synchronized consent information for the first data subject can include determining that the first processing action is a legitimate interest action that cannot be performed for the first purpose for the first data subject based on determining that the first purpose substantially matches a first objected purpose in the consent information retrieved for the first data subject.

Determining whether the first purpose substantially matches either a consented purpose or an objected purpose can include: providing the first purpose to a machine learning engine; providing the consented purpose or the objected purpose to the machine learning engine as a compared purpose; and receiving a classification from the machine learning engine regarding whether the first purpose substantially matches the compared purpose. As another example, determining whether the first purpose substantially matches either a consented purpose or an objected purpose can include: determining a first comparison metric for the first purpose; determining a second comparison metric for the consented purpose or the objected purpose; and determining whether the first purpose substantially matches the consented purpose or the objected purpose based on whether a difference between the first comparison metric and the second comparison metric is within a threshold distance. The first comparison metric and the second comparison metric can be based on purpose name similarity. As another example, the first comparison metric and the second comparison metric can be based on one or more of purpose metadata similarity, wherein purpose metadata includes at least one of purpose hierarchy information, purpose data category information, retention period information for data that is processed for a purpose, or data origin information for data that is processed for a purpose.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application Example 1. A computer-implemented method comprising:
  receiving, by different applications in a multiple-application landscape, consent information from data subjects that indicates consent or objection to processing performed by a data controller for a specified purpose;
  distributing consent information received by different applications to the different applications in the multiple-application landscape;
  synchronizing, by each application, consent information obtained by the application and consent information obtained by other applications and distributed to the application to generate synchronized consent information;
  identifying a first processing action to be performed by a first application for a first purpose for a first data subject;
  retrieving synchronized consent information for the first data subject; and
  evaluating the synchronized consent information for the first data subject to determine whether the first processing action can be performed for the first purpose by the first application for the first data subject.

Example 2. The Example of claim 1, wherein at least a first application uses a central consent service to obtain consent information for the first data subject.

Example 3. The Example of any preceding example, wherein the consent information includes metadata that indicates one or more of a manner in which a consent request was presented to the first data subject, an indication of whether the first data subject gave consent for the first application to perform the first processing action for the first data subject for the first purpose, or an indication of whether the first data subject gave explicit objection for the first application to perform the first processing action for the first data subject for the first purpose.

Example 4. The Example of any preceding example, wherein the first application synchronizes consent information with a second application by performing a peer-to-peer synchronization process with the second application.

Example 5. The Example of any preceding example, wherein the first application synchronizes consent information with a second application by using a central synchronization service as an intermediary between the first application and the second application.

Example 6. The Example of any preceding example, wherein identifying the first processing action to be performed by the first application for the first purpose for the first data subject comprises receiving, at the first application, a request to perform the first processing action for the first purpose for the first data subject.

Example 7. The Example of any preceding example, wherein the first processing action is an allowable action that is allowed to be performed by the first application for the first purpose for the first data subject if the first data subject has provided consent for performing of the first processing action for the first purpose for the first data subject.

Example 8. The Example of any preceding example, wherein the first processing action corresponds to a legitimate processing action corresponding to a legitimate interest of a data controller that is allowed to be performed for the first purpose for the first data subject unless the first data subject has objected to performing of the first processing action for the first purpose for the first data subject.

Example 9. The Example of any preceding example, wherein evaluating the synchronized consent information for the first data subject comprises determining that the first processing action is a consented action that can be performed for the first purpose for the first data subject based on determining that the first purpose substantially matches a consented purpose to which the first data subject has provided consent for the first processing action for the first data subject.

Example 10. The Example of any preceding example, wherein evaluating the synchronized consent information for the first data subject comprises determining that the first processing action cannot be performed for the first purpose for the first data subject based on determining that the first purpose does not substantially match any consented purposes in the consent information retrieved for the first data subject.

Example 11. The Example of any preceding example, wherein evaluating the synchronized consent information for the first data subject comprises determining that the first processing action is a legitimate interest action that can be performed for the first purpose for the first data subject based on determining that the first purpose does not substantially match any objected purpose in the consent information retrieved for the first data subject.

Example 12. The Example of any preceding example, wherein evaluating the synchronized consent information for the first data subject comprises determining that the first processing action is a legitimate interest action that cannot be performed for the first purpose for the first data subject based on determining that the first purpose substantially matches a first objected purpose in the consent information retrieved for the first data subject.

Example 13. The Example of any preceding example, wherein determining whether the first purpose substantially matches either a consented purpose or an objected purpose comprises:

providing the first purpose to a machine learning engine;
  providing the consented purpose or the objected purpose to the machine learning engine as a compared purpose; and
  receiving a classification from the machine learning engine regarding whether the first purpose substantially matches the compared purpose.

Example 14. The Example of any preceding example, wherein determining whether the first purpose substantially matches either a consented purpose or an objected purpose comprises:

determining a first comparison metric for the first purpose;
  determining a second comparison metric for the consented purpose or the objected purpose; and
  determining whether the first purpose substantially matches the consented purpose or the objected purpose based on whether a difference between the first comparison metric and the second comparison metric is within a threshold distance.

Example 15. The Example of any preceding example, wherein the first comparison metric and the second comparison metric are based on purpose name similarity.

Example 16. The Example of any preceding example, wherein the first comparison metric and the second comparison metric are based on one or more of purpose metadata similarity, wherein purpose metadata includes at least one of purpose hierarchy information, purpose data category information, retention period information for data that is processed for a purpose, or data origin information for data that is processed for a purpose.

Example 17. A system comprising:

one or more computers; and a computer-readable medium coupled to the one or more computers having instructions stored thereon which, when executed by the one or more computers, cause the one or more computers to perform operations comprising:

receiving, by different applications in a multiple-application landscape, consent information from data subjects that indicates consent or objection to processing performed by a data controller for a specified purpose;

distributing consent information received by different applications to the different applications in the multiple-application landscape;

synchronizing, by each application, consent information obtained by the application and consent information obtained by other applications and distributed to the application to generate synchronized consent information;

identifying a first processing action to be performed by a first application for a first purpose for a first data subject;

retrieving synchronized consent information for the first data subject; and evaluating the synchronized consent information for the first data subject to determine whether the first processing action can be performed for the first purpose by the first application for the first data subject.

Example 18. The Example of example 17, wherein at least a first application uses a central consent service to obtain consent information for the first data subject.

Example 19. A non-transitory, computer-readable medium coupled to one or more processors and having instructions stored thereon which, when executed by the one or more processors, cause the one or more processors to perform operations, the operations comprising:

receiving, by different applications in a multiple-application landscape, consent information from data subjects that indicates consent or objection to processing performed by a data controller for a specified purpose;

distributing consent information received by different applications to the different applications in the multiple-application landscape;

synchronizing, by each application, consent information obtained by the application and consent information obtained by other applications and distributed to the application to generate synchronized consent information;

identifying a first processing action to be performed by a first application for a first purpose for a first data subject;

retrieving synchronized consent information for the first data subject; and evaluating the synchronized consent information for the
first data subject to determine whether the first pro-
cessing action can be performed for the first purpose by
the first application for the first data subject.

Example 20. The Example of example 19, wherein at least
a first application uses a central consent service to obtain
consent information for the first data subject.

What is claimed is:

1. A computer-implemented method comprising:

receiving, by different applications in a multiple-applica-
tion landscape, consent information received from data
subjects that indicates consent or objection by the data
subjects to processing, performed, using the different
applications, by a data controller that controls data for
the data subject, for a specified purpose;

distributing consent information received by different
applications to the different applications in the mul-
tiple-application landscape;

synchronizing, by each application, consent information
obtained by the application and consent information
obtained by other applications and distributed to the
application to generate synchronized consent informa-
tion;

identifying a first processing action to be performed by a
first application for a first purpose for a first data
subject;

retrieving synchronized consent information for the first
data subject; and evaluating the synchronized consent information for the
first data subject to determine whether the first pro-
cessing action can be performed for the first purpose by
the first application for the first data subject, wherein
the evaluating includes determining whether the first
purpose substantially matches any purpose in the syn-
chronized consent information for which the first data
subject has provided processing consent or a processing
objection.

2. The computer-implemented method of claim 1,
wherein at least a first application uses a central consent
service to obtain consent information for the first data
subject.

3. The computer-implemented method of claim 1,
wherein the consent information includes metadata that
indicates one or more of a manner in which a consent request
was presented to the first data subject, an indication of
whether the first data subject gave consent for the first
application to perform the first processing action for the first
data subject for the first purpose, or an indication of whether
the first data subject gave explicit objection for the first
application to perform the first processing action for the first
data subject for the first purpose.

4. The computer-implemented method of claim 1,
wherein the first application synchronizes consent informa-
tion with a second application by performing a peer-to-peer
synchronization process with the second application.

5. The computer-implemented method of claim 1,
wherein the first application synchronizes consent informa-
tion with a second application by using a central synchro-
nization service as an intermediary between the first appli-
cation and the second application.

6. The computer-implemented method of claim 1,
wherein identifying the first processing action to be per-
formed by the first application for the first purpose for the
first data subject comprises receiving, at the first application,
a request to perform the first processing action for the first
purpose for the first data subject.

7. The computer-implemented method of claim 1,
wherein the first processing action is an allowable action that
is allowed to be performed by the first application for the
first purpose for the first data subject if the first data subject
has provided consent for performing of the first processing
action for the first purpose for the first data subject.

8. The computer-implemented method of claim 7,
wherein the first processing action corresponds to a legiti-
mate processing action corresponding to a legitimate interest
of a data controller that is allowed to be performed for the
first purpose for the first data subject unless the first data
subject has objected to performing of the first processing
action for the first purpose for the first data subject.

9. The computer-implemented method of claim 8,
wherein evaluating the synchronized consent information
for the first data subject comprises determining that the first
processing action is a consented action that can be per-
formed for the first purpose for the first data subject based
on determining that the first purpose substantially matches a
consented purpose to which the first data subject has pro-
vided consent for the first processing action for the first data
subject.

10. The computer-implemented method of claim 9,
wherein evaluating the synchronized consent information
for the first data subject comprises determining that the first
processing action cannot be performed for the first purpose
for the first data subject based on determining that the first
purpose does not substantially match any consented pur-
poses in the consent information retrieved for the first data
subject.

11. The computer-implemented method of claim 10,
wherein evaluating the synchronized consent information
for the first data subject comprises determining that the first
processing action is a legitimate interest action that can be
performed for the first purpose for the first data subject based
on determining that the first purpose does not substantially
match any objected purpose in the consent information
retrieved for the first data subject.

12. The computer-implemented method of claim 11,
wherein evaluating the synchronized consent information
for the first data subject comprises determining that the first
processing action is a legitimate interest action that cannot
be performed for the first purpose for the first data subject
based on determining that the first purpose substantially
matches a first objected purpose in the consent information
retrieved for the first data subject.

13. The computer-implemented method of claim 1,
wherein determining whether the first purpose substantially
matches either a consented purpose or an objected purpose
comprises:

providing the first purpose to a machine learning engine;
providing the consented purpose or the objected purpose
to the machine learning engine as a compared purpose;
and receiving a classification from the machine learning
engine regarding whether the first purpose substantially
matches the compared purpose.

14. The computer-implemented method of claim 1,
wherein determining whether the first purpose substantially
matches either a consented purpose or an objected purpose
comprises:

determining a first comparison metric for the first pur-
pose;

determining a second comparison metric for the con-
sented purpose or the objected purpose; and determining whether the first purpose substantially
matches the consented purpose or the objected purpose based on whether a difference between the first comparison metric and the second comparison metric is within a threshold distance.

15. The computer-implemented method of claim 14, wherein the first comparison metric and the second comparison metric are based on purpose name similarity.

16. The computer-implemented method of claim 14, wherein the first comparison metric and the second comparison metric are based on one or more of purpose metadata similarity, wherein purpose metadata includes at least one of purpose hierarchy information, purpose data category information, retention period information for data that is processed for a purpose, or data origin information for data that is processed for a purpose.

17. A system comprising:
one or more computers; and
a non-transitory computer-readable medium coupled to the one or more computers having instructions stored thereon which, when executed by the one or more computers, cause the one or more computers to perform operations comprising:
 receiving, by different applications in a multiple-application landscape, consent information received from data subjects that indicates consent or objection by the data subjects to processing, performed, using the different applications, by a data controller that controls data for the data subject, for a specified purpose;
 distributing consent information received by different applications to the different applications in the multiple-application landscape;
 synchronizing, by each application, consent information obtained by the application and consent information obtained by other applications and distributed to the application to generate synchronized consent information;
 identifying a first processing action to be performed by a first application for a first purpose for a first data subject;
 retrieving synchronized consent information for the first data subject; and
 evaluating the synchronized consent information for the first data subject to determine whether the first processing action can be performed for the first purpose by the first application for the first data subject, wherein the evaluating includes determining whether the first purpose substantially matches any purpose in the synchronized consent information for which the first data subject has provided processing consent or a processing objection.

18. The system of claim 17, wherein at least a first application uses a central consent service to obtain consent information for the first data subject.

19. A non-transitory computer-readable medium coupled to one or more processors and having instructions stored thereon which, when executed by the one or more processors, cause the one or more processors to perform operations, the operations comprising:
 receiving, by different applications in a multiple-application landscape, consent information received from data subjects that indicates consent or objection by the data subjects to processing, performed, using the different applications, by a data controller that controls data for the data subject, for a specified purpose;
 distributing consent information received by different applications to the different applications in the multiple-application landscape;
 synchronizing, by each application, consent information obtained by the application and consent information obtained by other applications and distributed to the application to generate synchronized consent information;
 identifying a first processing action to be performed by a first application for a first purpose for a first data subject;
 retrieving synchronized consent information for the first data subject; and
 evaluating the synchronized consent information for the first data subject to determine whether the first processing action can be performed for the first purpose by the first application for the first data subject, wherein the evaluating includes determining whether the first purpose substantially matches any purpose in the synchronized consent information for which the first data subject has provided processing consent or a processing objection.

20. The non-transitory computer-readable medium of claim 19, wherein at least a first application uses a central consent service to obtain consent information for the first data subject.

* * * * *